United States Patent
Ryu

(10) Patent No.: US 7,124,406 B2
(45) Date of Patent: Oct. 17, 2006

(54) MODELING METHOD FOR DISCRETE EVENT SYSTEM USING EVENT FLOW CHART

(75) Inventor: Min-Soo Ryu, Seoul (KR)

(73) Assignee: Inus Technology Inc., Seoul (KR)

( * ) Notice: Subject to any disclaimer, the term of this patent is extended or adjusted under 35 U.S.C. 154(b) by 644 days.

(21) Appl. No.: 10/312,660

(22) PCT Filed: Jun. 29, 2001

(86) PCT No.: PCT/KR01/01124

§ 371 (c)(1),
(2), (4) Date: Dec. 27, 2002

(87) PCT Pub. No.: WO02/01342

PCT Pub. Date: Jan. 3, 2002

(65) Prior Publication Data

US 2003/0182334 A1    Sep. 25, 2003

(30) Foreign Application Priority Data

Jun. 29, 2000    (KR)    ................ 2000-36669

(51) Int. Cl.
*G06F 9/45*    (2006.01)
*G06F 9/44*    (2006.01)

(52) U.S. Cl. ............... 717/144; 717/131; 717/132
(58) Field of Classification Search ............ 717/144, 717/100, 103, 107, 135, 140, 158; 707/100, 707/102, 200, 3; 700/83; 703/13, 14, 17; 706/45, 10; 719/315, 316; 716/129–133
See application file for complete search history.

(56) References Cited

U.S. PATENT DOCUMENTS

| | | | | |
|---|---|---|---|---|
| 5,193,182 A | * | 3/1993 | Bachman et al. | 707/100 |
| 5,212,771 A | * | 5/1993 | Gane et al. | 715/854 |
| 5,469,553 A | * | 11/1995 | Patrick | 713/323 |
| 5,485,600 A | * | 1/1996 | Joseph et al. | 703/13 |
| 5,544,348 A | * | 8/1996 | Umeda et al. | 703/17 |
| 5,623,666 A | * | 4/1997 | Pike et al. | 707/200 |
| 5,694,579 A | * | 12/1997 | Razdan et al. | 703/14 |
| 5,778,059 A | * | 7/1998 | Loghmani et al. | 379/243 |
| 5,794,040 A | * | 8/1998 | Ono et al. | 717/100 |
| 6,021,403 A | * | 2/2000 | Horvitz et al. | 706/45 |
| 6,272,672 B1 | * | 8/2001 | Conway | 717/107 |
| 6,728,955 B1 | * | 4/2004 | Berry et al. | 717/158 |

FOREIGN PATENT DOCUMENTS

| | | |
|---|---|---|
| JP | 03083138 | 4/1991 |
| JP | 09245014 | 9/1997 |
| KR | 1999-0016586 | 3/1999 |

* cited by examiner

*Primary Examiner*—Wei Zhen
*Assistant Examiner*—Anna Deng
(74) *Attorney, Agent, or Firm*—Sheridan Ross P.C.

(57) ABSTRACT

A method for modeling a Discrete Event System includes the steps of: a) receiving the user-defined requirement and specification of a Discrete Event System; b) extracting events and action from the user-defined requirement and specification and storing the events and action; c) generating a tree-type data structure including start node; d) searching the stored events to determine existence of allowable events from the event represented by a leaf node. which quits the generation of the tree-type data structure when there is no allowable event; e) when there is the allowable event in the stored events, generating a child node of the leaf node, the child node representing to allowable event and F) iterating the step of searching and the step of generating a child node for all the leaf nodes of the tree-type data structure.

14 Claims, 27 Drawing Sheets

CD PLAYER REQUIREMENT & SPECIFICATION
1. THE PLAYER IS SUPPLIED WITH THE POWER WHEN TURNED ON.
2. THE PLAYER PLAYS MUSIC WHEN THE PLAY BUTTON IS PRESSED IN THE CONDITION OF TURN-ON.
3. THE PLAYER STOPS PLAYING MUSIC AND BE READY FOR PLAYING THE FIRST TRACK OF MUSIC CD WHEN THE PAUSE BUTTON IS PRESSED IN PROCESS OF PLAYING MUSIC.
4. THE POWER SUPPLY IS SHUT OFF WHEN THE PLAYER IS TURNED OFF.

FIG. 4

$i_1$: TURN ON THE CD PLAYER
$i_2$: PRESS PLAY BUTTON
$i_3$: PRESS STOP BUTTON
$i_4$: TURN OFF THE CD PLAYER $I = \{i_1, i_2, i_3, i_4\}$ $s_1$: Power Off
$s_2$: Stopped
$s_3$: Playing $S = \{s_1, s_2, s_3\}$ $o_1$: SUPPLY WITH THE POWER
$o_2$: PLAY MUSIC
$o_3$: STOP PLAYING MUSIC
$o_4$: SHUT OFF THE POWER SUPPLY $O = \{o_1, o_2, o_3, o_4\}$

FIG. 5

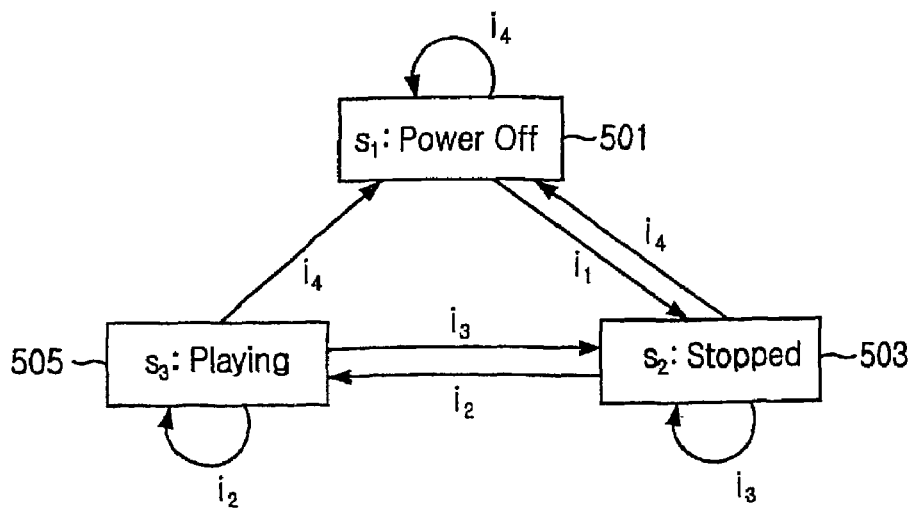

FIG. 6

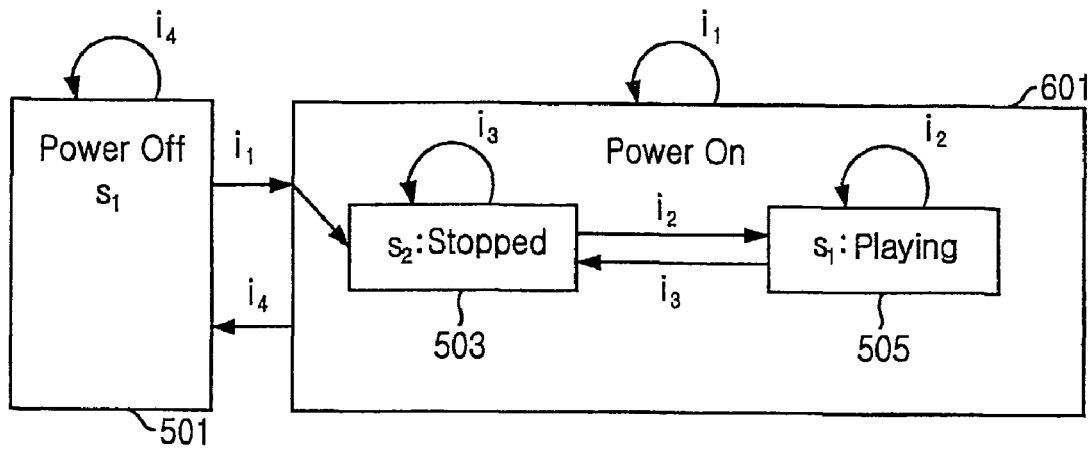

FIG. 7

CD PLAYER REQUIREMENT & SPECIFICATION
1. THE PLAYER IS SUPPLIED WITH THE POWER WHEN TURNED ON.
2. THE PLAYER PLAYS MUSIC WHEN THE PLAY BUTTON IS PRESSED IN THE CONDITION OF TURN-ON.
3. THE PLAYER STOPS PLAYING MUSIC WHEN THE PAUSE BUTTON IS PRESSED IN PROCESS OF PLAYING MUSIC
4. THE PLAYER STOPS PLAYING MUSIC TEMPORARILY WHEN THE PAUSE BUTTON IS PRESSED IN PROCESS OF PLAYING MUSIC.
5. THE PLAYER RESUMES PLAYING MUSIC WHEN THE PLAY BUTTON OR PAUSE BUTTON IS PRESSED IN PROCESS OF TEMPORARY HALT OF PLAYING MUSIC.
6. THE PLAYER IGNORES THE PRESS OF PAUSE BUTTON IN PROCESS OF HALT OF PLAYING MUSIC.
7. THE POWER SUPPLY IS SHUT OFF WHEN THE PLAYER IS TURNED OFF.

FIG. 19A

```
struct event_s {
    /* object that accepts input */
    object_s        *obj_p;                         /* the object */
    int             input_type;                     /* type of input */
    event_s         *pre_event_p;                   /* preceding event */
    event_s         *suc_event_p[MAX_EVENT];        /* succeeding events */
    event_s         *unconditional_event_p          /* unconditional flow */
    condition_s     *condition_p;                   /* condition */
    action_s        *entry_action_p;                /* entry action */
    action_s        *exit_action_p;                 /* exit action */
    BOOL            interrupt_flag;                 /* interrupt event? */
    BOOL            return_flag;                    /* return flag? */
    BOOL            unconditional_flag              /* unconditional? */
    BOOL            self_flow_flag;                 /* self-flow allowed? */
    event_s         *disabled_event[MAX_EVENT];     /*disabled event list*/
};

struct event_s *ihbe;          /* immediate happened-before event */
struct event_s *pre_ihbe;      /* previous ihbe */
```

FIG. 19B

```
/* stack for returning events */ struct event_s *return_event_stack[MAX_EVENT];

int stack_index;                    /* current index of the stack */
```

FIG. 19C

```
/* allowable event list of ihbe */ struct event_s *allowable_event{MAX_EVENT];

int num_allowable_event; /* number of allowable events of ihbe */ event_s* match_event (object_s *obj, input in) {
    int i;
    /* compute the allowable events of ihbe */
    /* in doing so, consider if self-flow is allowed, */
    /* also consider disabled events */
    num_allowable_event = ... ;
    for (i = 0; i < num_allowable_event; i++) [
        allowable_event[i] = ...;
    }
```

FIG. 19D

```
/* find the occurred event from the allowable_event array */
for ( i = 0; i < num_allowable_event; i++) {
        if ( (allowable_event[i]->obj_p == obj) &&
                (allowable_event[i]->input_type == in) ) {
                return allowable_event[i];
        }
} return NULL;
}
```

FIG. 19E

```
BOOL check_condition (condition_s* cond) {

...

/* if the condition is true */ return TRUE;

...

/* otherwise */ return FALSE;

```
void do_action (action_s *action) {

...

/* do the action */

```
void update_engine (event_s *source, event_s *target) {

...

if (target->interrupt_flag) {
     return_event_stack[stack_index++] = source;
    } if (target->return_flag) {
            ihbe = return_event_stack[stack_index--];   /* update ihbe */
    }
     else if (target->unconditional_flag) {
            ihbe = target->unconditional_event_p;    /* update ihbe */
     }
     else {
      ihbe = target;                                   /* update ihbe */
     }

```
BOOL has_event_occurred(object_s **obj, int *type) {

...

/* if any event occurred */

*obj = ...      /* return the object that has accepted the input */

*type = ...     /* return the input type */ return TRUE;

/* otherwise */ return FALSE;

```
void main (void) {
    event_s *source_event;
    event_s *target_event;
    object_s *obj;
    int type;
    BOOL ret;

/* initialization */
    ...
    source_event = ihbe;
    while (has_event_occurred(&obj, &type)) {
        target_event = match_event(obj, type);
        if (target_event == NULL)
            continue;
        else {
            if (check_condition(target_event->condition_p)) {
                do_action(source_event->exit_action_p);
                do_action(target_event->entry_action_p);
                update_engine(target_event);
            }
        }
    }
}
```

MODELING METHOD FOR DISCRETE EVENT SYSTEM USING EVENT FLOW CHART

TECHNICAL FIELD

The present invention relates to modelling and implementation of Discrete Event System (DES); and more particularly, to a method for modelling DES according to Event Flow Chart (EFC) and Event Flow Control Engine (EFCE) implementing the DES modelled by the EFC.

BACKGROUND ART

First of all, the terms used in this specification for describing the present invention are as follows:

(1) State: a state is defined by the properties or attributes of DES and defines the behaviour of DES. The state of DES changes to others. DES should be in any state at any point of time.

As an example, CD player powered on has "playing", "stopped", etc. and is in any one of those states at any point of time.

(2) Immediate sub-state: The conception of state is hierarchical. Any state can have a number of subordinate states. Those subordinate states are called immediate sub-states.

As an example of CD player, "playing" and "stopped" are immediate sub-states of "power-on".

(3) Immediate super-state: Contrary conception of immediate sub-state.

As an example of CD player, "power-on" is immediate super-state of "playing" and "stopped". Immediate super-state is abstracted conception of immediate sub-state representing immediate sub-state. "Playing" state of CD player is thus "power-on" state.

(4) Sub-state: Extended conception of immediate sub-state. Sub-state includes immediate sub-state and all the subordinate states of the immediate sub-state.

(5) Super-state: Extended conception of immediate super-state. Super-state includes immediate super-state and all the superior states of the immediate super-state.

(6) Sibling state: Sibling states have identical immediate super-state.

As an example of CD player, "playing" and "stopped" are sibling states that have identical immediate super-state or "power-on".

(7) Hierarchical depth: The number of super-states.

(8) Active state: The state where DES currently stays. The other states are referred to inactive states. Active state is also called current state.

(9) State transition: The transference of DES active state from one to another.

(10) Event: The change occurred inside/outside of DES and affecting DES. An event is input of DES and concrete phenomenon that generates output and state change of DES.

(11) Guard condition: Guard condition determines allowance of state transition.

(12) Action: The event that DES generates when state transition occurs. Action is output of DES.

(13) State Transition Diagram (STD): Diagram proposed by Moore and Mealy representing transitive relationship between states.

(14) State Chart: Extended type of STD proposed by David Harel. Hierarchical structure is added to Moore and Mealy's STD so that parallel state or orthogonality can be represented.

(15) Transition-allowed state: Transition-allowed states are ones to which current state is allowed to transfer to.

FIG. 1 is flowchart of development process of Discrete Event System

As shown in FIG. 1, the process of developing DES generally comprises "REQUIERMENT AND SPECIFICATION" step for describing the functions of DES (S101), "ANALYSIS AND DESIGN" step for modelling the DES according to the requirement and specification (S103), "IMPLEMENTATION" step for implementing the result of modelling (S105), and "VERIFICATION" step for verifying the DES (S107).

The process of developing DES generally iterates several times until the DES satisfies the requirement and specification. The process of developing DES is repeated from the "REQUIERMENT AND SPECIFICATION" step (S101) if an error is detected or the DES needs change of function.

The "ANALYSIS AND DESIGN" step (S103) has sub steps of "DESCRIPTION OF SYSTEM", "ASCERTAINMENT OF ELEMENTS", "DESCRIPTION OF RELATIONSHIP OF ELEMENTS" and "MODELLING OF DYNAMIC BEHAVIOUR".

The present invention is provided with a method for designing and implementing Discrete Event System (DES) and more particularly deals with a method for describing and implementing dynamic behaviour of DES, this method needed in the step of "ANALYSIS AND DESIGN" step (S103).

FIGS. 2A and 2B show the characteristics of non-state system and state system.

DES is system where response of DES is triggered by the occurrence of event(s). DES is classified into non-state system and state system.

Non-state system, as shown in FIG. 2A, has output dependent only upon input and its behaviour is relatively simple. I is set of input $i_j$ of DES, O is set of output $O_k$ of DES, S is set of state $S_l$ of DES, and f is output function.

State system, as shown in FIG. 2B, has output dependent upon both input and state of DES and its behaviour is relatively complicate. State system needs the sub step of "MODELLING OF DYNAMIC BEHAVIOUR". Function g is state function.

Distinction between non-state system and state system is apparent from FIGS. 2A and 2B.

As shown in FIGS. 2A and 2B, it is ascertainment of output function f(•) that is needed in modelling non-state system because there is only relationship "$O_k=f(i)$" in non-state system. Thus, modelling non-state system is relatively simple process requiring only the relationship between input and output.

On the other hand, most real-world systems are state systems. The output function f(•) of state system needs state variable $S_l$ that is current state, that is, state variable $S_l$ is needed for determining output $O_k$. Next state $S_x$ is determined by state function $S_x=g(i_j, S_l)$.

The degree of difficulty in modelling state system is much higher than the degree of difficulty in modelling non-state system because of description of state change.

FIG. 3 illustrates requirement and specification of CD player; FIG. 4 shows events, actions and states extracted from the requirement and specification of FIG. 3; FIG. 5 is State Transition Diagram modelled by the requirement and specification of FIG. 3; and FIG. 6 is State Chart modelled by the requirement and specification of FIG. 3.

There are State Transition Diagram (STD) proposed by Moore and Mealy and State Chart (SC) proposed by David Harel for representing state change (Refer to FIGS. 5 and 6).

STD represents transition between states and is drawn on flatly. Input event $i_j$ generating state transition is generally marked on STD.

State transition process of STD is as follows:
(1) Event occurs;
(2) Guard condition is tested; and
(3) State transition is executed on the condition that the guard condition is satisfied.

Exit action of current state, state change, and entry action of the target state are sequentially performed in execution of state transition.

As an example of CD player, FIG. 4 shows input (I, event)/output (O, action)/states (S) ascertained from the given requirement and specification of FIG. 3.

FIG. 5 shows STD drawn by the input (I, event)/output (O, action)/states (S) of FIG. 4. Default state 501 is initial state or sub-state that the CD player automatically enters when the CD player enters arbitrary state.

STD was not utilised widely even though STD visually represents transition relationship between states to improve efficiency of modelling because of flat structure having the shortcoming that flat structure cannot represent complicate transition relationship between states.

Harel's SC overcomes the shortcoming of STD. SC can represent hierarchical state transition relationship. Any state of SC can have a number of subordinate sub-states in itself, which is generalised type of state diagram.

FIG. 6 shows SC drawn by the input (I, event)/output (O, action)/states (S) of FIG. 4.

As an example of CD player shown in FIG. 6, states of "Stopped" (503) and "Playing" (505) are possible only when the CD player is powered on and state of "Power On" (601) can be abstracted from the states of "Stopped" (503) and "Playing" (505). The states of "Stopped" (503) and "Playing" (505) thus become sub-states of the state of "Power On" (601), and the state of "Power On" (601) becomes super-state of the states of "Stopped" (503) and "Playing" (505).

The step of "Stopped" (503) is default state of the step of "Power On" (601) because the CD player automatically enters the step of "Stopped" (503).

Harel's SC is implemented on the commercial software [STATEMATE] of [I-Logix], [BetterState] of [MatrixX], and [Stateflow] of [Matlab] for visual modelling of DES using the concept of SC.

Commercial software [Rapid] of [Emultek] for designing man-machine interface also uses similar concept but has distinction that SC is of tree structure on the ground that SC has hierarchical structure(The referred name of software and/or company may be the registered trademark held by that company).

Modelling DES by methodology of SC is known to have advantage of DES implementation, modification and extension due to exact description of DES dynamic behaviour.

But it is difficult to model DES by methodology of SC. Modelling DES by methodology of SC fundamentally requires exact ascertainment of DES states. There is quite a possibility that inconceivable modelling flaw may exist and the result of modelling DES by methodology of SC can vary with designers because of abstractness of conception "state".

It is difficult for non-expert to model DES by methodology of SC and different DES model of SC can result by different view of experts.

CD player is very simple system with only three (3) states and can be modelled by different view as shown in FIGS. 5 and 6.

An abstract characteristic of conception "state" also makes modification and extension of already completed DES model complicated.

FIG. 7 illustrates requirement and specification with pause function added to the requirement and specification of FIG. 3; FIG. 8 shows events, actions and states extracted from the requirement and specification of FIG. 7; and FIGS. 9A to 9C show three (3) types of State Charts different to one another and modelled by the requirement and specification of FIG. 7.

Requirement and specification and event/action/states of FIGS. 3 and 7 differs from each other in that CD player of state "play" after "stop" plays tracks from the first track and CD player of state "play" after "paused" plays tracks of former position.

The following is illustrating various modelling according to designer:

Modelling I defines "Paused" as sub-state of "Stopped" (503);

Modelling II defines "Paused" as sub-state of "Playing" (505); and

Modelling III defines "Paused" as sibling state of "Stopped" (503) and "Playing" (505).

FIGS. 9A to 9C respectively show SCs corresponding to Modelling I/II/III.

It is difficult to determine which model is better in that efficiency of model is determined by purpose or implementation of DES. But different model from identical DES decrease efficiency of development when men cooperate in development. Consistency of development is also decreased because of different view of identical designer as the case may be.

To overcome the problem of abstractness in conventional SC, Message Sequence Chart (MSC) of International Telecommunication Union (ITU) and [Cult3D] of [Cycore] were proposed to stress characteristic of event.

Messages of MSC are the entire communication phenomenon including data transfer and function call and can be treated as events. MSC is structural method describing data flow by dealing with message transference between components of which DES comprises.

Sequence Diagram and Collaboration Diagram of UML (Unified Modelling Language) similar to MSC use the same concept and can be considered as slightly modified type of MSC.

But there is defect that MSC cannot describe control flow controlling entire DES including data transference or behaviour in component itself in that MSC just describes data transference.

[Cult3D], different from MSC, describes behaviour of DES. But [Cult3D] can describe behaviour of only non-state system and thus cannot describe state dependant behaviour. That is, there is a weak point that [Cult3D] describes relationship of input and output by $O_k=f(i_j)$, ignoring state change and cannot describe dynamic behaviour of DES.

The following is references that aid in understanding the present invention:

1) David Harel, "State charts, a visual approach to complex systems", Science of Computer Programming, 1987;

2) David Harel, "On Visual Formalism", Communication of the ACM, pp 514–530, May 1988;

3) David Harel, "STATEMATE: A Working Environment for Development of Complex Reactive System", IEEE Transaction on Software Engineering, pp 403–414, April 1997;

4) D. Coleman, F. Hayes and S. Bear, "Introducing object charts or how to use state charts in object-oriented design", IEEE Transactions on software engineering, vol. 18, no. 1, pp. 9–18, January 1992;

5) D. Budgen, "Software Design", Addison Wesley, pp 123–135, 1994;

6) Antti Auer, "State Testing of Embedded Software, University of Oulu, Department of Information Processing Science and Infotech Oulu, Research paper series A2T, March 1997;

7) P. Ramadge and W. M. Wonham, "The Control of Discrete Event Systems", Proceedings of the IEEE, Vol 77, No. 1, 1989;

8) Quatrani, Terry., "Visual Modeling with Rational Rose and UML", Addison Wesley, 1998;

9) Gomaa, Hassan., "Software Design Methods for Concurrent and Real-Time Systems", Addison Wesley, 1993; and 10) ITU (International Telecommunication Union), "ITU-T Recommendation Z.120—Message Sequence Chart", ITU, November 1999.

DISCLOSURE OF INVENTION

It is, therefore, an object of the present invention to provide a method for modelling a Discrete Event System (DES) using event flow chart (EFC) that can completely describe the DES at ease only by describing event flow without the concept of state of DES, and a computer-readable recording medium for recording a program that embodies the method.

It is another object of the present invention to provide a system for controlling the EFC-modelled DES according to the method of the present invention.

Those who are skilled in the art of the present invention will easily recognize another purposes and advantages of this invention from the drawings, detailed description of the invention, and claims.

In accordance with one aspect of the present invention, there is provided a method for modelling a Discrete Event System including the steps of: a) receiving user-defined requirement and specification of the Discrete Event System; b) extracting events and actions from the requirement and specification and storing the events and actions; c) generating a tree-type data structure including start node; d) searching the stored events to determine existence of allowable events at an event represented by a leaf node, which quits the generation of the data structure when there is no allowable event; e) when there is an allowable event in the stored events, generating a child node of the leaf node, the child node representing the allowable event; and f) iterating the step of searching and the step of generating a child node for all the leaf nodes of the data structure.

In accordance with one aspect of the present invention, there is provided a computer-readable recording medium for recording a program for performing a method for modelling a Discrete Event System in a modelling system provided with a processor, the method including the steps of: a) receiving user-defined requirement and specification of the Discrete Event System; b) extracting events and actions from the requirement and specification and storing the events and actions; c) generating a tree-type data structure including start node; d) searching the stored events to determine existence of allowable events at an event represented by a leaf node, which quits the generation of the data structure when there is no allowable event; e) when there is an allowable event in the stored events, generating a child node of the leaf node, the child node representing the allowable event; and f) iterating the step of searching and the step of generating a child node for all the leaf nodes of the data structure.

In accordance with one aspect of the present invention, there is provided a modelling system for modelling Discrete Event System, the modelling system comprising: encoding means for receiving user-defined requirement and specification of the Discrete Event System and transforming the requirement and specification to the code that the modelling system can read; parsing means for extracting events and actions of the Discrete Event System from the code transformed by the encoding means; saving means for saving the extracted events and actions; event node generating means for generating and saving a tree-type data structure including start node and leaf node; and event searching means for searching the stored events stored in the saving means to determine existence of allowable events at an event represented by a leaf node, which quits the generation of the data structure when there is no allowable event, and driving the event node generating means to generate a child node of the leaf node when there is an allowable event in the stored events, the child node representing the allowable event.

In accordance with one aspect of the present invention, there is provided an event flow control system for implementing the event flow chart modelled by the modelling system, the event flow control system comprises: event matching means for determining whether or not inputted event is allowable event to which current node representing event is allowed to transfer; condition test means for determining if the condition for execution of the inputted event is satisfied when the inputted event is the allowable event; action execution means for executing action corresponding to the inputted event to drive the Discrete Event System modelled with the event flow chart when the condition for execution of the inputted event is satisfied; and node update means for updating current node when the inputted event is the return flow control event or the unconditional flow control event.

The present invention minimise error in modelling DES and modelling dependency upon designers by eliminating abstractness of state.

The present invention includes DES modelling method and implementing method based on EFC to overcome shortcomings that conventional DES modelling method has.

DES modelling method according to the present invention includes interrupt event, return flow and unconditional flow to improve efficiency of DES modelling.

The interrupt event for recalling formerly occurred event and the return flow for compelling event flow to predetermined event is useful to DES for resuming former event flow of DES and restoring former operation.

The unconditional flow for exceptionally compelling event flow to predetermined event, which deviates from the rule of event flow control, is useful to designers for reducing redundancy and simplifying EFC in the case of repeating identical event flow.

EFC according to the present invention is implemented by event flow control engine (EFCE) comprising event matching means, condition test means, control means, action execution means and IHBE (immediate happened-before event) update means.

The event matching means performs determining whether or not currently occurred event matches with or belongs to set of allowable events. The condition test means performs determining whether or not flow to the successfully matched event is possible. The action execution means executes action of DES when the result of the condition test is true. The IHBE update means performs IHBE update for next event flow.

BRIEF DESCRIPTION OF DRAWINGS

The above and other objects and features of the present invention will become apparent from the following description of the preferred embodiments given in conjunction with the accompanying drawings, in which:

FIG. 3 illustrates requirement and specification of CD player;

FIG. 4 shows events, actions and states extracted from the requirement and specification of FIG. 3;

FIG. 5 is State Transition Diagram modelled by the requirement and specification of FIG. 3;

FIG. 6 is State Chart modelled by the requirement and specification of FIG. 3;

FIG. 7 illustrates requirement and specification with pause function added to the requirement and specification of FIG. 3;

FIGS. 19A to 19I show pseudo program code implementing Event Flow Control Engine.

BEST MODE FOR CARRYING OUT THE INVENTION

Figure 1:
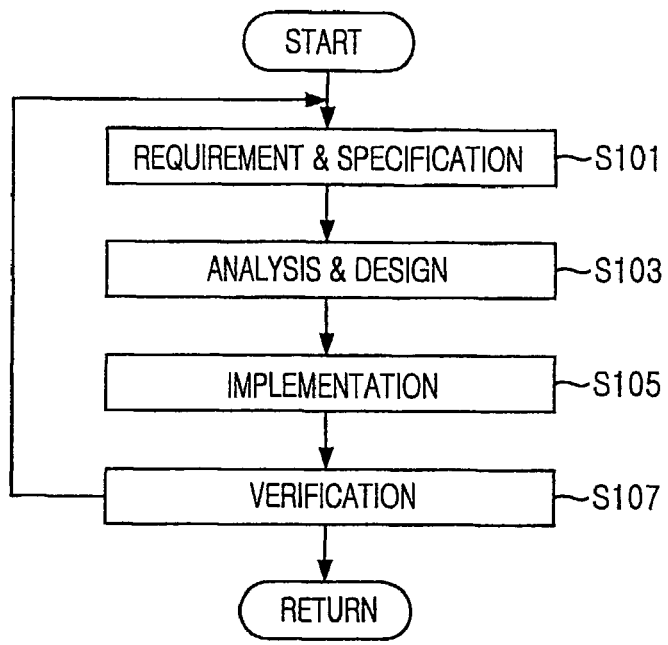
FIG. 1 is flowchart of development process of Discrete Event System.

The above and other objects and features of the present invention will become apparent from the following description of the preferred embodiments given in conjunction with the accompanying drawings. First, in giving reference number to the elements of the drawings, we tried to give the identical elements the same number as much as possible, although they are shown in different drawings. Also, in it is determined that too much detailed description on the related prior art may make the points of this invention blurry, that description is omitted. Referring to accompanying drawings, the preferred embodiments of the present invention will be described in detail, hereinafter.

EFC describes the occurrence of allowable events in DES, which is the same modelling as SC in that they describes dynamic behaviour even though they differ from each other in that SC describes abstract states and EFC describes concrete events.

State transition process of SC is also applied to EFC. EFC defines term "event flow" instead of "state transition" for the purpose of easily designing EFC by hiding the concept of state. For the same purpose, EFC defines several terms that have similar concept but different to those of SC.

The following table shows the terms of EFC and the corresponding terms of SC.

TABLE

| EEC | Sc |
| --- | --- |
| (Immediate) preceding event | (Immediate) super-state |
| (Immediate) succeeding event | (Immediate) sub-state |
| Immediate happened before event (IHBE) | Current state |
| Sibling event | Sibling state |
| Allowable event | Transition-allowed state |
| Self event flow | Self transition |
| Event flow | State transition |
| Disabled event list | Transition-disabled state |

As shown in table, when there is direct link between two (2) events in EFC, that is, the two (2) events have relationship of parent-child in tree structure, parent event that is closer by root is called immediately preceding event (IPE) to child event that is farther from root called immediately succeeding event (ISE) to parent event.

Immediately preceding event (IPE) and immediately succeeding event (ISE) are similar to immediate super-state and immediate sub-state respectively. Preceding event and succeeding event are defined in similar way of super-state and sub-state respectively. Immediate happened-before event (IHBE) is event lately occurred and similar to current event of SC.

Allowable event to which IHBE is allowed to transfer is similar to transition-allowed state. Event flow, similar to state transition, is occurrence of event and execution of state transition. Self event flow is similar to self transition, Disabled event list representing prohibited event flow is similar to set of transition-disabled state whose transition is prohibited.

Event flow means acknowledgement of occurred allowable event at current state and state transition according to the acknowledgement. Event flow control defines the flow of event, which is substantially identical to state transition mechanism.

Figure 2A:
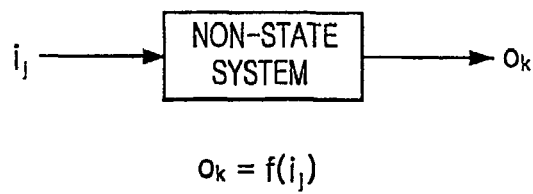
FIGS. 2A and 2B show the characteristics of non-state system and state system.
Figure 2B:
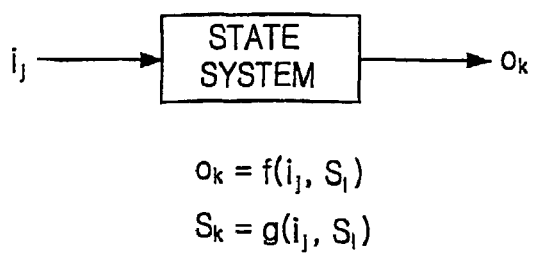
Figure 8:
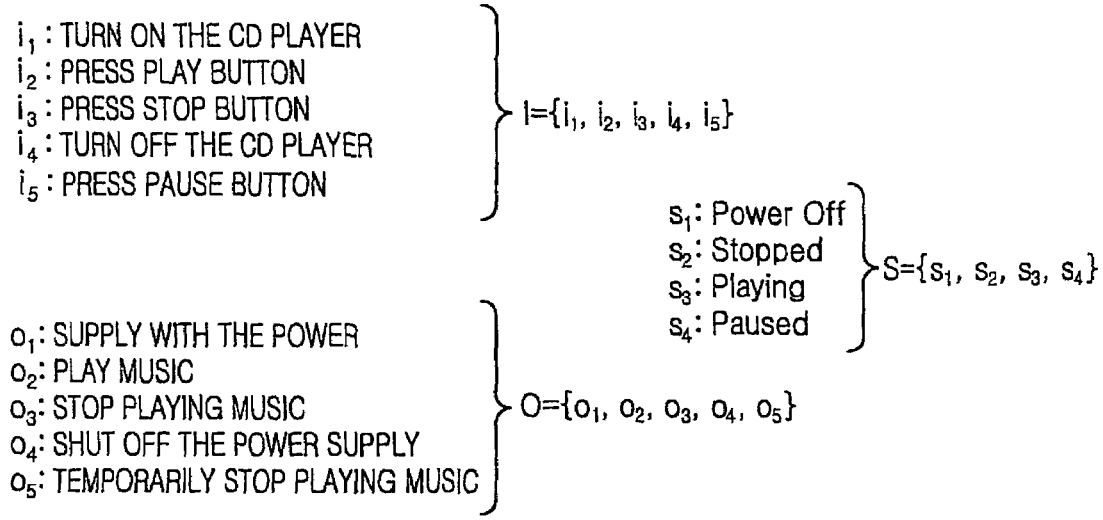
FIG. 8 shows events, actions and states extracted from the requirement and specification of FIG. 7.

EFC according to the present invention is modified representation equivalent to SC. The reason why modelling is possible only with events is that event is substantially unique factor that can determine state transition and can replace state. $S_x=g(i_j,S_l)$ shown in FIG. 2B is recursive equation and shows that the state is determined by event. The present invention provides a method for transforming SC to EFC and a method for transforming EFC to SC.

FIGS. 10A to 10D illustrate transforming process from State Chart to Event Flow Chart according to the present invention.

Transform rule I (transform from SC to EFC):

Step 1) SC is represented by tree structure (state tree). The tree structure is constructed with super-state linked to sub-state as a parent node of sub-state;

Step 2) Super-state is made as default state;
Step 3) Events that cause transition are marked on edges;
Step 4) States that cannot do self transition are marked;
Step 5) Sibling states to which each state is not allowed to transfer are marked; and
Step 6) State is replaced with event.
Transform rule II (transform from EFC to SC):
Step a) Event is replaced with state;
Step b) The tree is represented by SC diagram format with relationship of inclusion that super-state includes sub-state;
Step c) Duplicated default state is removed; and
Step d) Transitive relationship is marked.

Super-state is made as default state at Step 2) for the purpose of removing abstract characteristic of super-state. EFC does not accept the abstract super-state and replace it with concrete default state.

Step 4) and Step 5) are the ones for overcoming the limitation of representation that state tree has. State tree does not have explicit representation of self and inter-sibling transition because state tree represents hierarchical relationship denominated "parent" and "child".

Basically all the states can do self transition and all the sibling states can transit to any other sibling state as far as explicit mark does not exist.

Figure 10A:
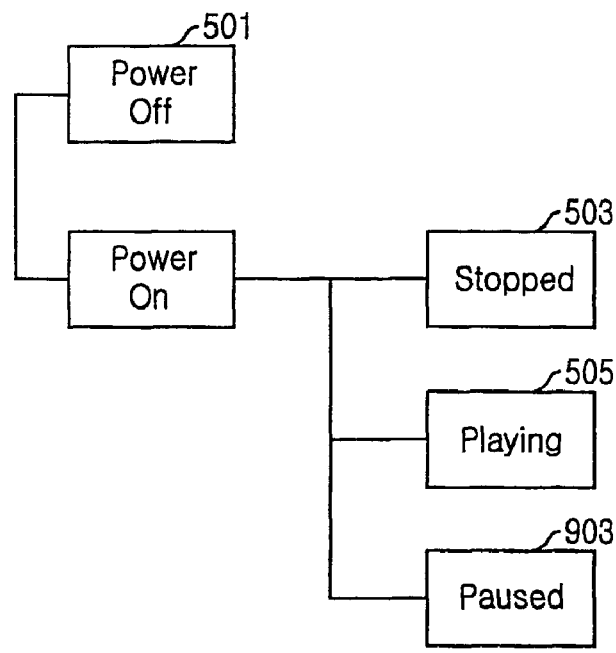
FIGS. 10A to 10D illustrate transforming process from State Chart to Event Flow Chart according to the present invention.
Figure 10B:
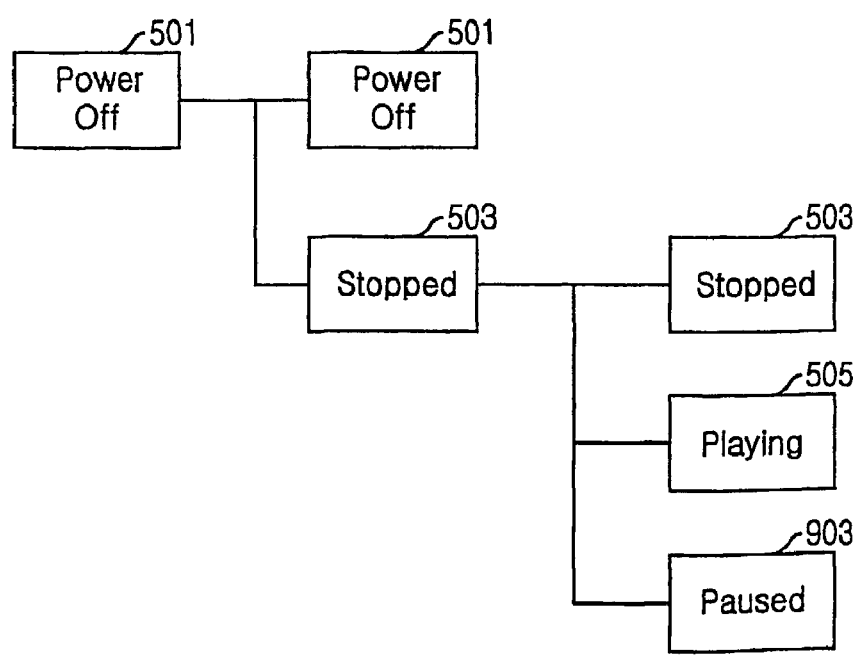
Figure 10C:
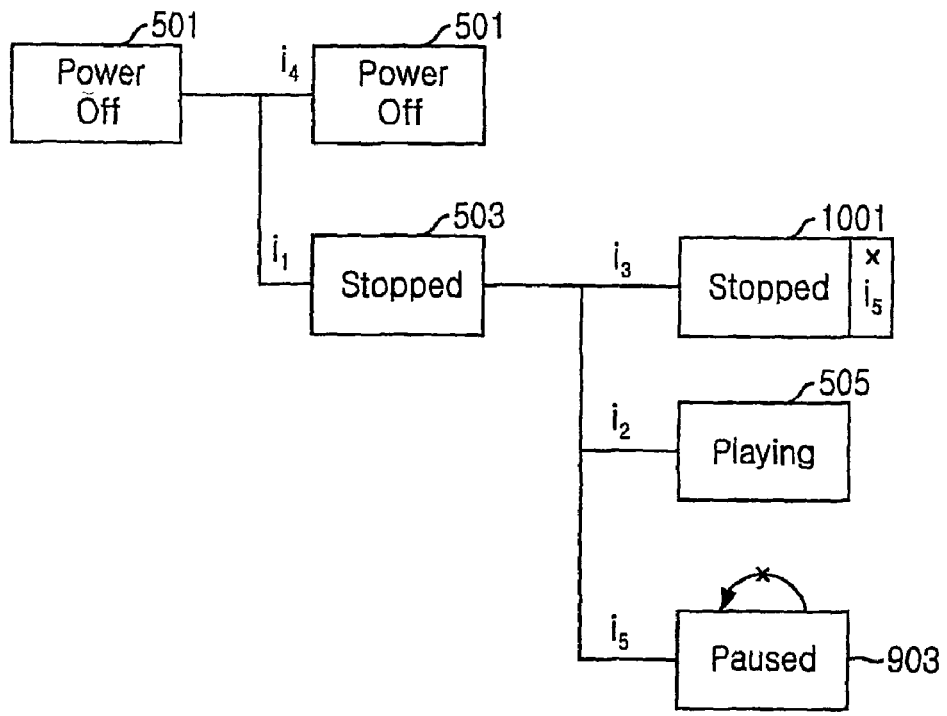
Figure 10D:
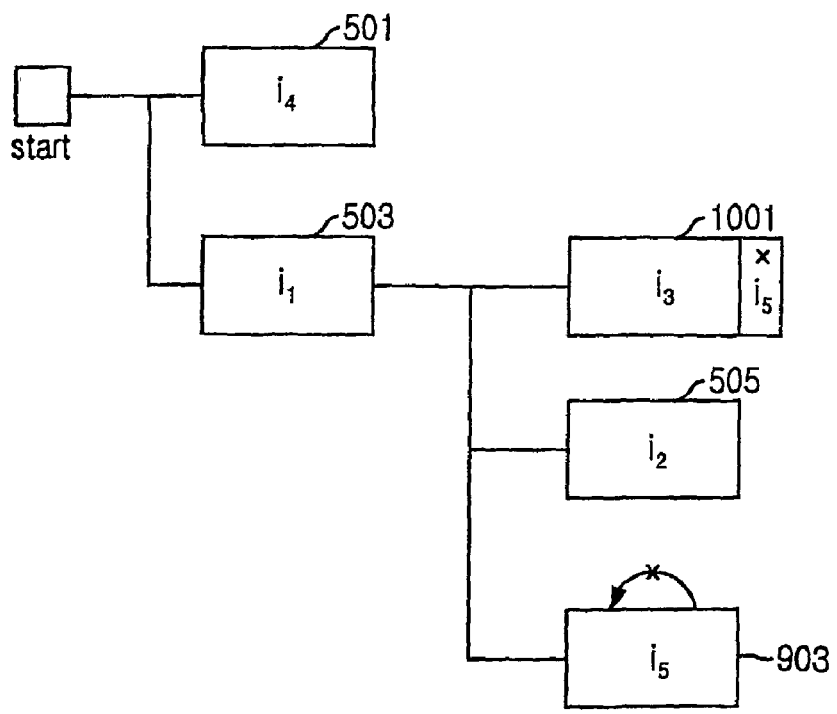

As shown in FIG. 10D, "Paused" (903) that cannot do self transition and to which "Stopped" (1001) is not allowed to transfer is marked with impossibility of self transition and in the transition-disabled state list of "Stopped" (1001).

That duplicated default state is removed in the Step c) means that default state positioned as super-state is removed and abstract super-state is represented.

FIG. 10D shows EFC finally transformed from SC.

Figure 11:
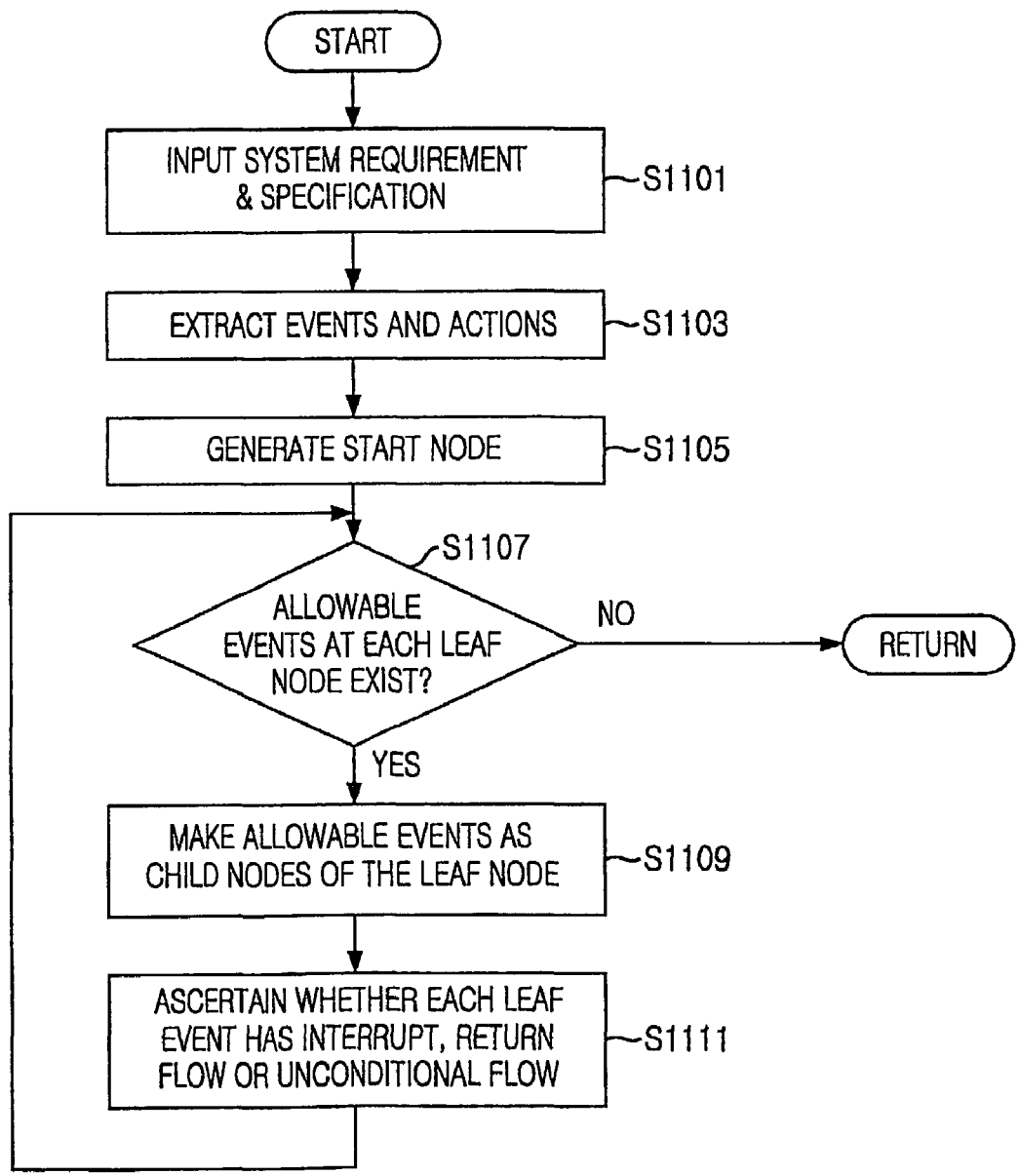
FIG. 11 is flowchart of generating Event Flow Chart directly from the requirement and specification of FIG. 7.
Figure 12A:
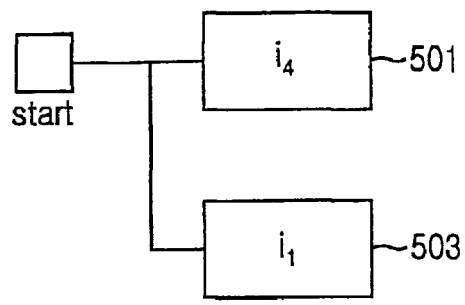
FIGS. 12A to 12D illustrates the process of modelling CD player as Event Flow Chart from the requirement and specification of FIG. 7.
Figure 12B:
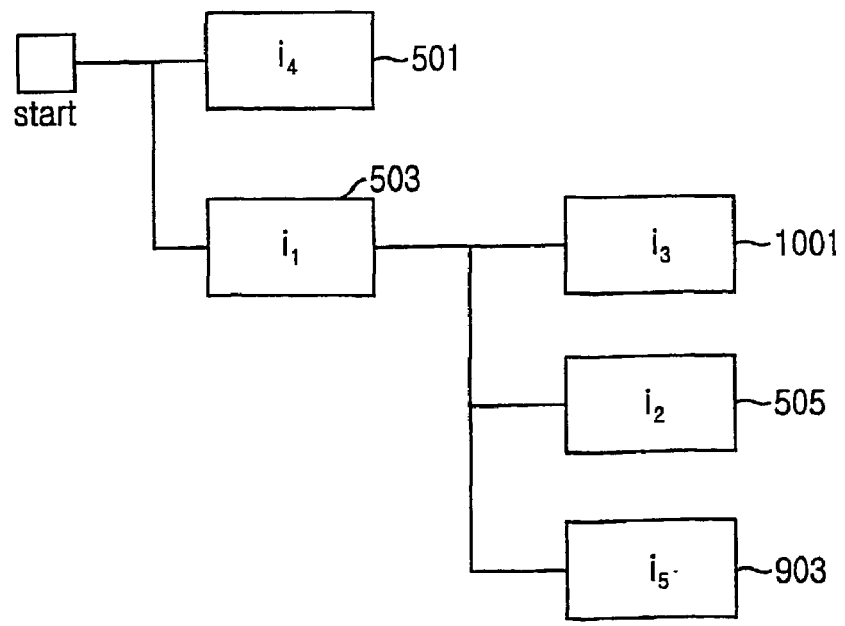
Figure 12C:
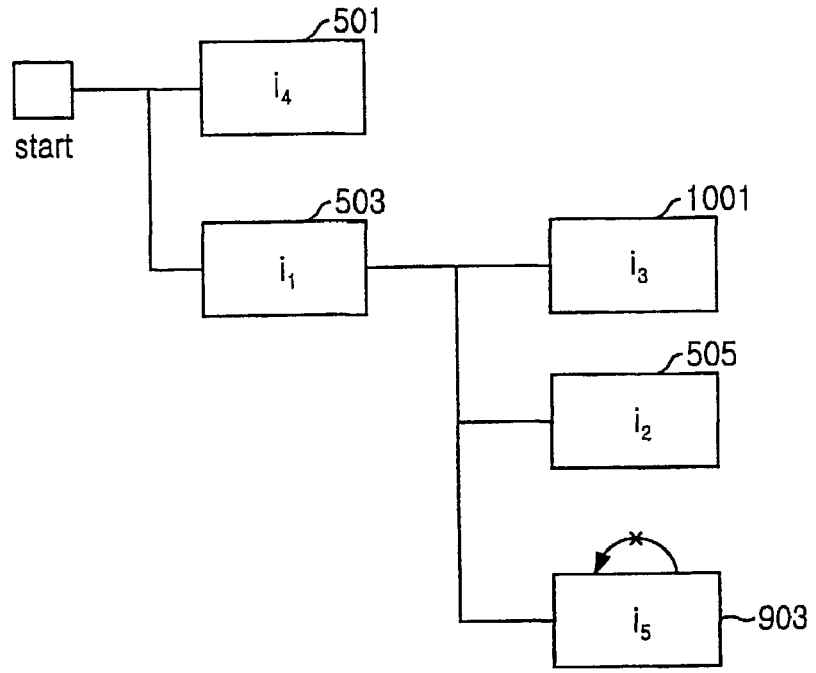
Figure 12D:
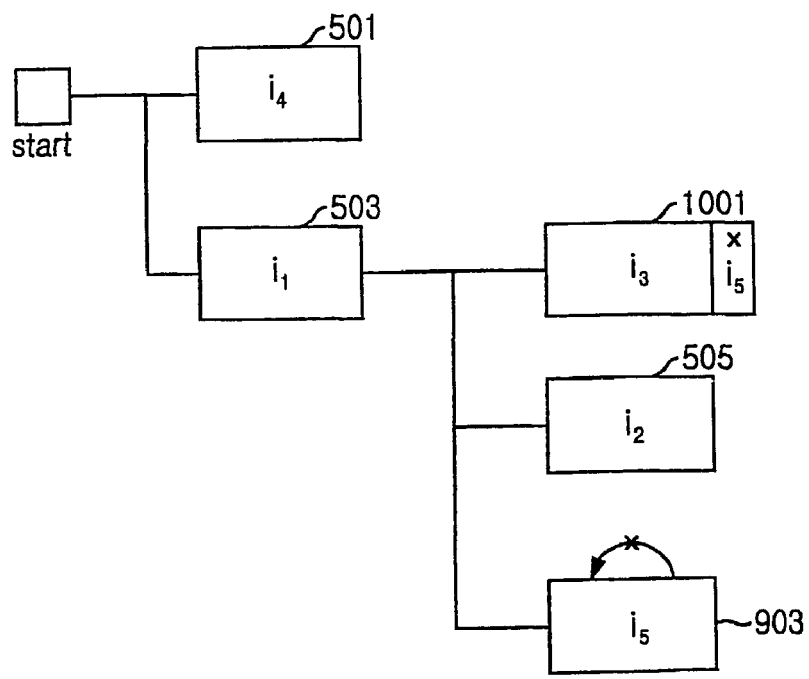

FIG. 11 is flowchart of generating Event Flow Chart directly from the requirement and specification of FIG. 7.

The primary merit of the present invention is that EFC can be directly generated from requirement and specification without extracting state of abstract concept and still can describe the DES just like conventional method.

EFC is basically generated in accordance with relationship of ordered precedence. EFC is constructed with allowable events linked in order from the initial state that DES automatically enters at the start of DES. Two (2) events linked to each other form preceding-succeeding relationship. The event closer by the initial state or parent event in tree structure of EFC is preceding event. The child event of the preceding event is called succeeding event. The tree structure of EFC is constructed with ease because allowable events and preceding-succeeding relationship of them can be easily extracted from requirement and specification.

DES modelling method of EFC according to the present invention can describe the DES just like conventional method on the ground that DES modelling method of EFC and that of SC are completely transformed to each other.

As shown in FIG. 11, when requirement and specification of DES is inputted Event Flow Control Engine (EFCE) that is described later S1101, EFCE extracts events and actions from the inputted requirement and specification (S1103). The respective extracted event is matched to corresponding one of the extracted actions.

After extraction of step S1103, start node is generated to construct EFC tree structure (S1105). The start node of EFC tree structure does not define any event.

Then, EFCE makes start node as leaf node and determines whether or not there is any allowable event at the leaf node with the extracted events of step S1103 (S1107). EFC construction process is terminated because of completion when there is no allowable event at the leaf node.

EFC tree structure is constructed with allowable event made as child node of the leaf node when there is allowable event at the leaf node (S1109).

EFCE then determines whether or not the generated child node is any one of interrupt event, return flow control event, and unconditional flow control event described later and saves the child node as that event in case that the child node is one of interrupt event, return flow control event, and unconditional flow control event (S1111).

The generated child node is then made as leaf node and the steps S1107 to S1111 is performed on all the leaf nodes generated and included in the EFC tree structure.

The step S1103 is performed by the encoding means and parsing means for encoding user defined requirement and specification and extracting events and actions. The extracted events and corresponding actions are save in data storage means.

The process of step S1105 and S1109 generating nodes of EFC tree structure and making allowable events as leaf nodes is performed by event node generating means, allowable events determined by event searching means.

The event searching means performs the process of step S1107 determining whether or not allowable events exist at every each leaf node.

The process of step S1111 of determining whether or not every each leaf event is interrupt event, return flow control event, or unconditional flow control event, and of generating the interrupt flag, return flow control flag, or unconditional flow control flag at the corresponding event according to the determination is performed by flag generating means.

FIGS. 12A to 12D illustrates the process of modelling CD player as Event Flow Chart from the requirement and specification of FIG. 7.

FIGS. 12A to 12D illustrates the process of modelling CD player as Event Flow Chart from the requirement and specification of FIG. 7.

Gradual process of constructing EFC from requirement and specification is as follows:

(1) Allowable event succeeding IHBE is made as succeeding event of IHBE. Initially allowable event is linked to start node because there is no IHBE defined in the beginning. In case of succeeding event has already defined as the node that event flow is possible, this step of (1) is omitted.

(2) Whether or not every each succeeding event defines self event flow is determined and the list of disabled events to which the succeeding event is not allowed to transfer is constructed.

(3) Every each succeeding event as IHBE and the steps (1) and (2) are performed on every each IHBE.

The following is process of constructing EFC as an example from requirement and specification of CD player shown in FIG. 7 to which "pause" function is added:

(a) Allowable events are linked to Start node. $i_1$ (503) that is event of "TURN ON THE CD PLAYER" or $i_4$ (501) that is event of "TURN OFF THE CD PLAYER" are allowable and linked to start node (Refer to FIG. 12A);

(b) Succeeding event of $i_4$ (501) is described. In this illustration $i_1$ (503) and $i_4$ (501) are of candidate but have been already described. So linking $i_1$ (503) and $i_4$ (501) to $i_4$ (501) is omitted (Refer to FIG. 12B);

(c) Succeeding event of $i_1$ (503) is described. Linking $i_1$ (503) and $i_4$ (501) to $i_1$ (503) is omitted with the same reason that step (b) has. On the other hand, $i_2$ (505) that makes CD player play music, $i_3$ (1001) that makes CD player stop playing music, and $i_5$ (903) that makes CD player temporarily stop playing music, all of which is described for the first time, are linked to $i_1$ (503) as succeeding events (Refer to FIG. 12B);

(d) $i_5$ (903) is made to be disabled for self event flow for reoccurrence of $i_5$ (903) in the paused condition makes CD player play music (Refer to FIG. 12C); and (e) $i_5$ (903) is included in the disabled event list of $i_3$ (1001) for reoccurrence of $i_5$ (903) in the stopped condition has no meaning. Construction of EFC modelling CD player is completed (Refer to FIG. 12D).

Constructing EFC tree from requirement and specification can be performed with ease therefore because it is more concrete process than conventional process using the concept of state, that is, the present invention hides the process of understanding the abstract concept of state and describes concrete event. The present invention has the merit that any one who is not familiar with the concept of state can model DES and that the modelling according to the present invention is not dependant on designers.

Figure 9A:
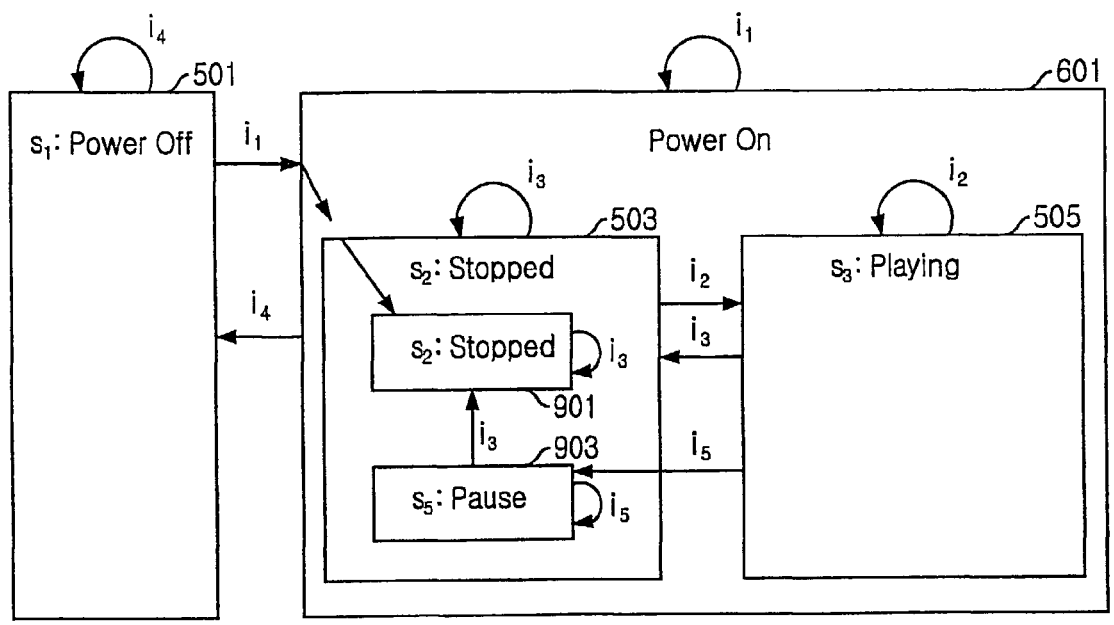
FIGS. 9A to 9C show three (3) types of State Charts different to one another and modelled by the requirement and specification of FIG. 7.
Figure 9B:
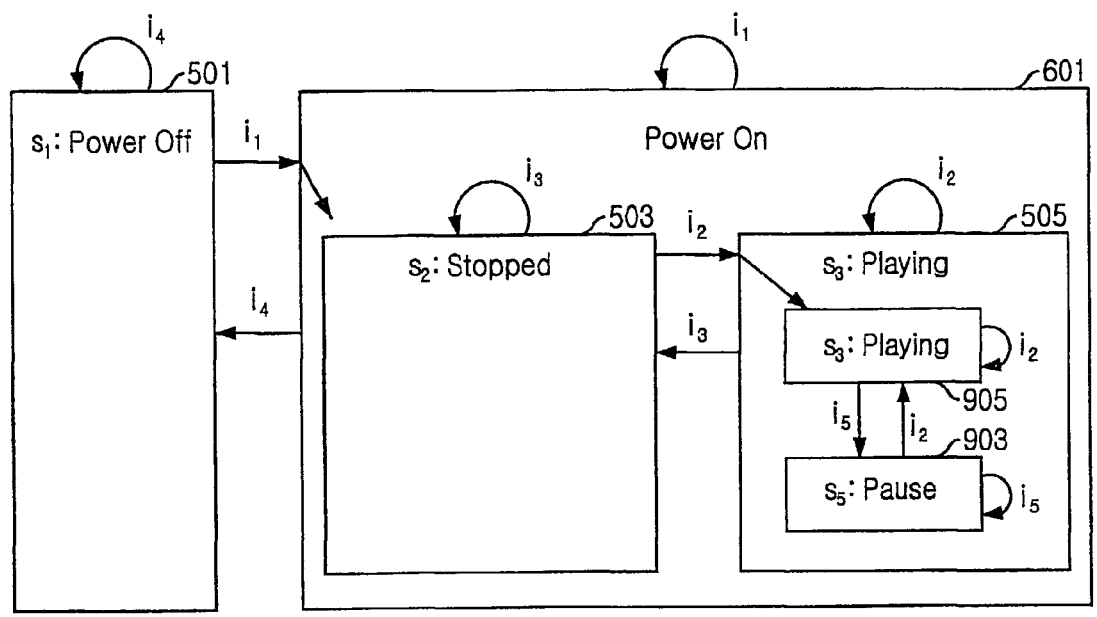
Figure 9C:
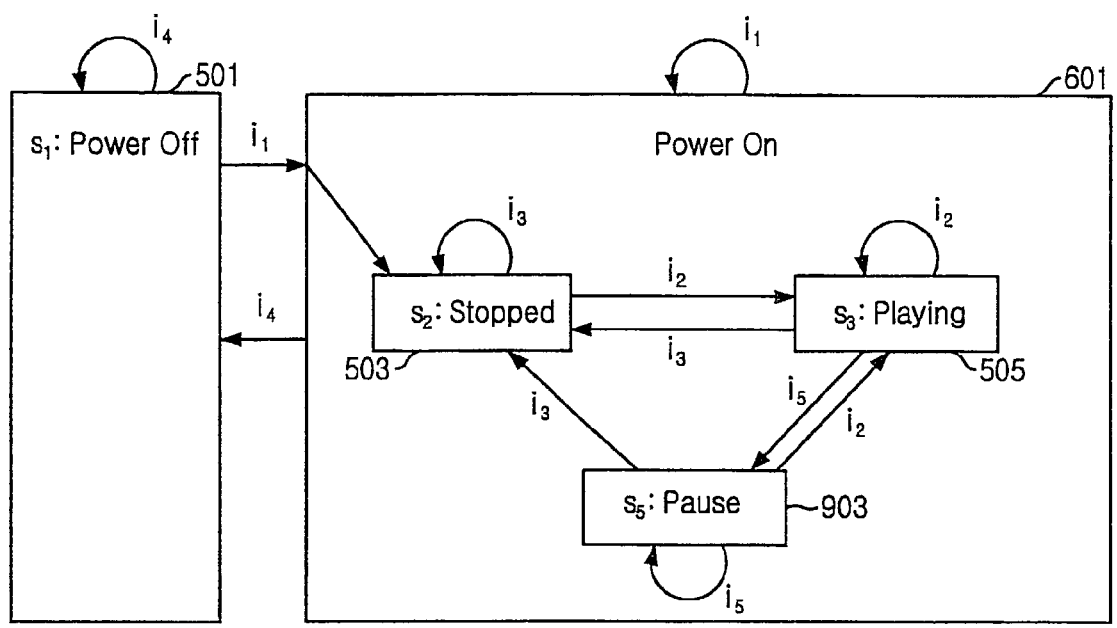
Figure 15:
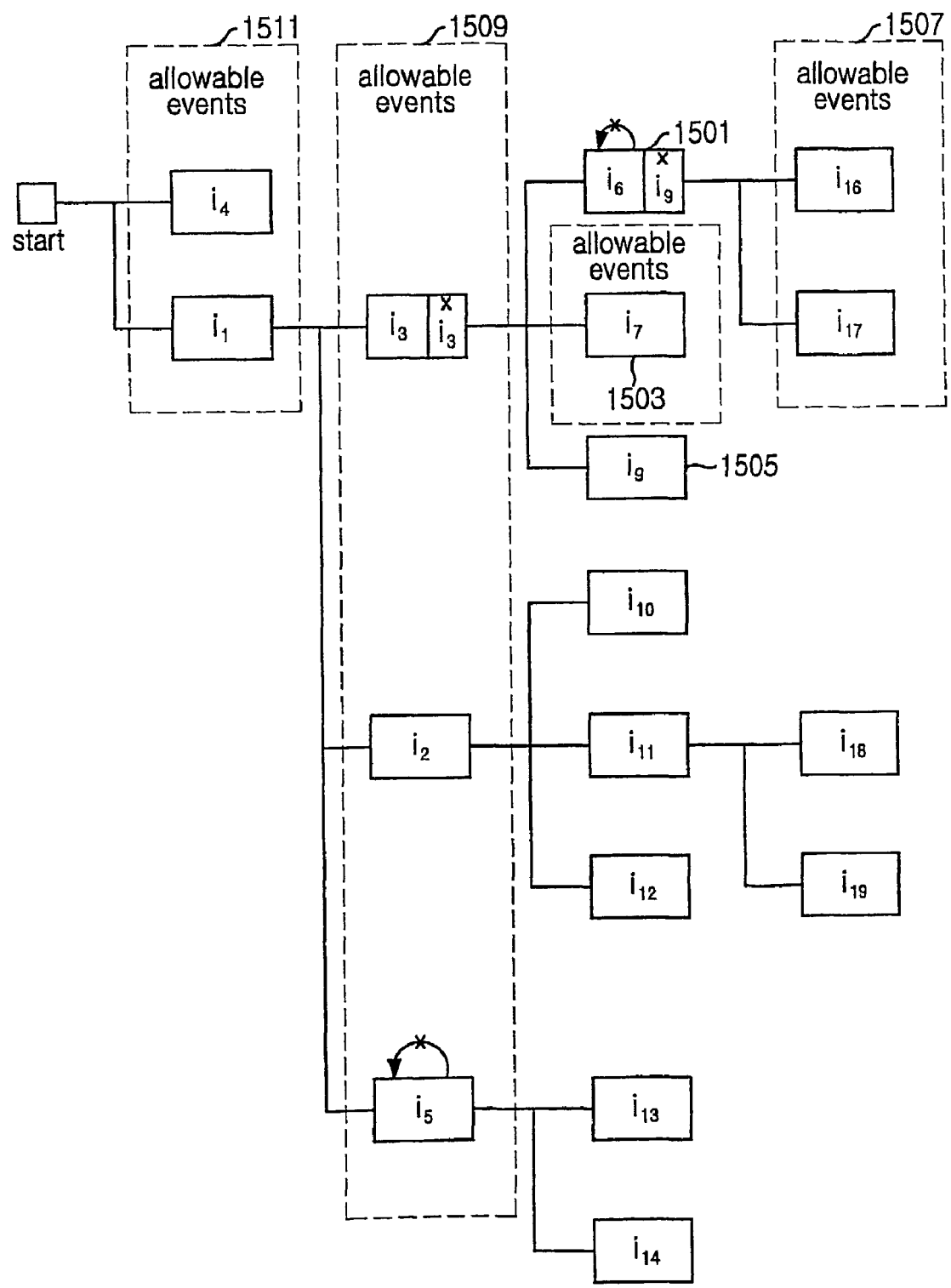
FIG. 15 illustrates allowable events.

FIG. 15 illustrates allowable events. Event flow of EFC has the same mechanism as state transition of SC. In case of SC, transition-allowed states of current state are immediate sub-states, sibling states, and sibling states of super-states of the current state. Let's find transition-allowed states of "Paused" (903) shown in FIG. 9C. "Paused" (903) is allowed to transfer to "Stopped" (503) and "Playing" (505) that are sibling states of "Paused" (903), and "Power Off" (501) that is sibling state of super-state "Power On" (601). "Paused" (903) has no immediate sub-state.

Sub-state is allowed to transfer to sibling states of super-state, which is not represented in SC. This is because the current state is included in super-state. "Paused" (903) is included in "Power On" (601) and "Power On" (601) is allowed to transfer to "Power Off" (501). "Paused" (903) is therefore allowed to transfer to "Power Off" (501). So the set of transition-allowed states of "Paused" (903) is Stopped (503), Playing (505), and Power Off (501).

EFC defines event flow in the same way as SC defines state transition. Allowable events are immediate succeeding event, sibling event and sibling event of preceding events. Event flow follows the relationship of preceding and succeeding and hierarchical structure.

FIG. 15 shows allowable events at $i_6$ (1501). The allowable events are $\{i_{16}, i_{17}\}$ (1507) that are immediate succeeding events of $i_6$ (1501), $\{i_7\}$ (1503) that is sibling event of $i_6$ (1501), and $\{i_3, i_2, i_5\}$ (1509) and $\{i_4, i_1\}$ (1511) that are sibling events of preceding events of $i_6$ (1501). $i_6$ (1501) itself is omitted for self event flow is prohibited. $i_9$ (1505) is omitted because of disabled event even though sibling events of $i_6$ (1501).

Figure 16:
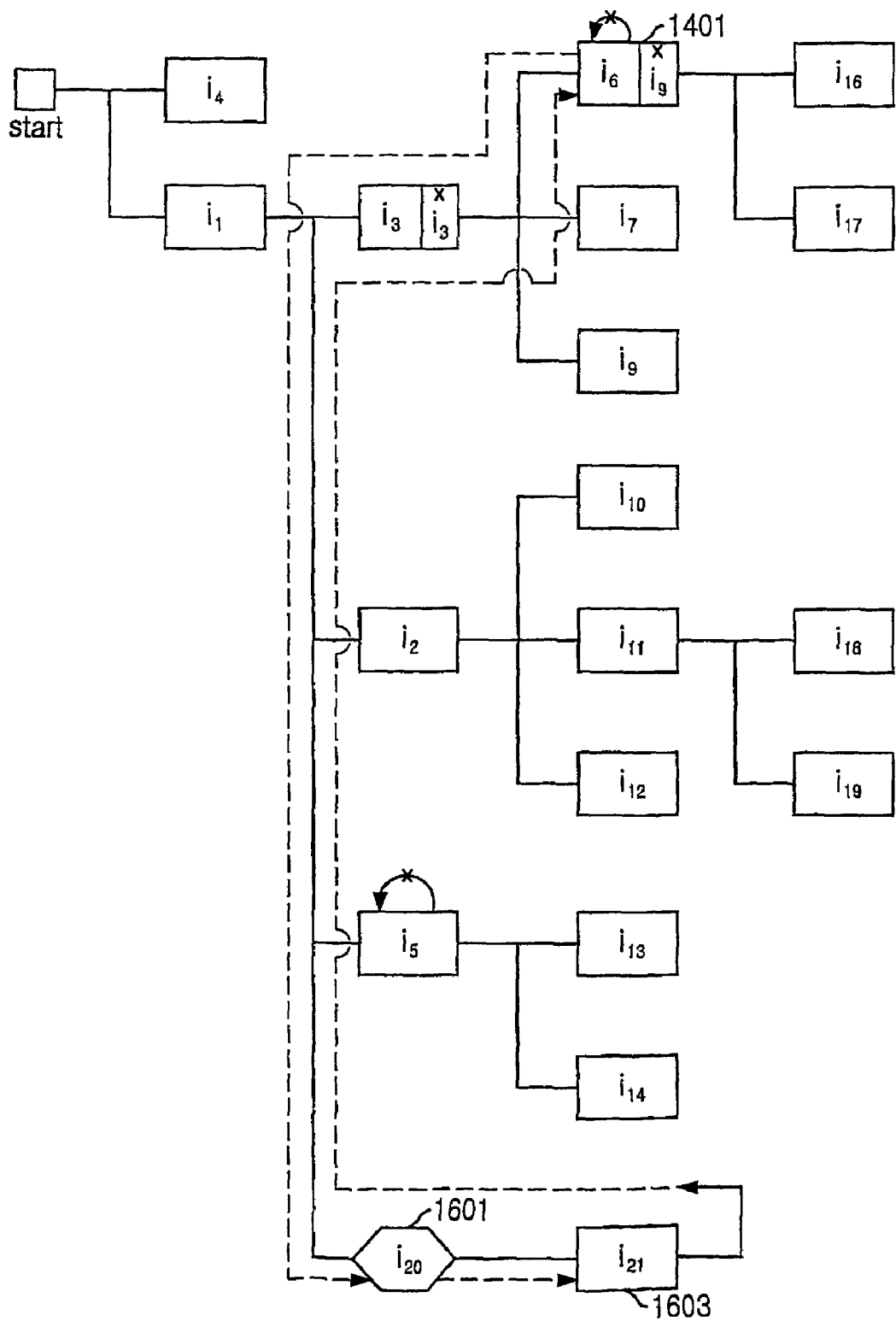
FIG. 16 illustrates event flow control by interrupt event/return flow control event.
Figure 17:
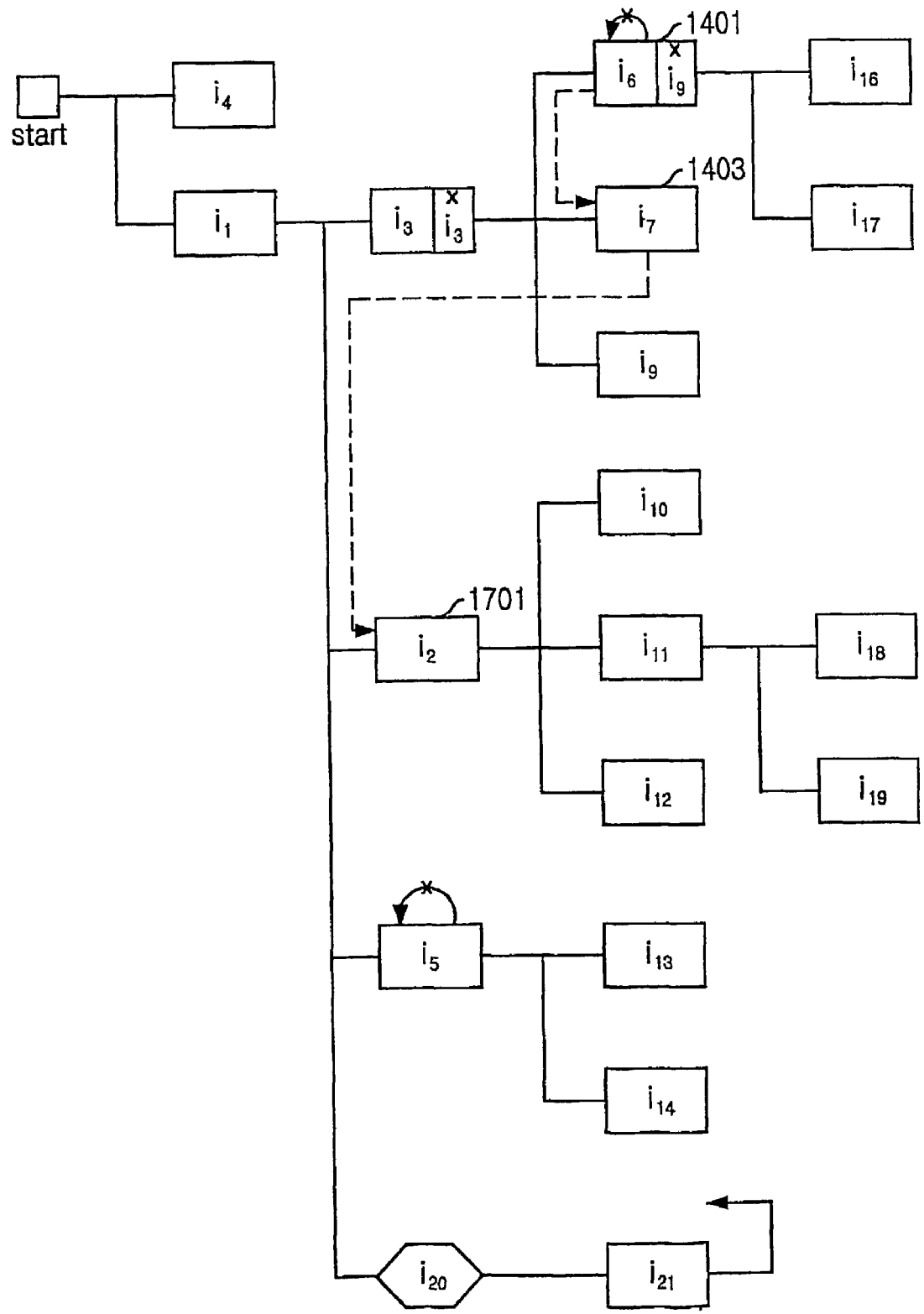
FIG. 17 illustrates event flow control, by unconditional flow control event.

FIG. 16 illustrates event flow control by interrupt event/return flow control event; and FIG. 17 illustrates event flow control by unconditional flow control event.

Extended characteristics are added to the method for constructing EFC according to the present invention, which improves the performance of modelling EFC.

The first one is interrupt event and return flow. EFCE has global stack and push the current IHBE to the stack when interrupt event occurs.

EFCE then pops lately pushed node and makes DES jump to the state according to the popped node when return flow control event occurs. Return flow control event cannot have succeeding events.

DES is restored to the former state by the interrupt event. As shown in FIG. 16, when IHBE is $i_6$ (1401), $i_6$(1401) is pushed to the stack by the occurrence of interrupt event $i_{20}$ (1601). When IHBE is $i_{20}$ (1601), $i_6$ (1401) is popped from the stack and IHBE is updated to $i_6$ (1401) by the occurrence of return flow control event $i_{21}$ (1603). That is, by the occurrence of return flow control event, IHBE is updated to lately pushed node of event without occurrence of that lately pushed node of event. The return flow control event $i_{21}$ (1603) does not have succeeding events.

The second one of extended characteristics is unconditional flow control event that forces the event flow. When the unconditional flow is defined, IEEE unconditionally jumps to the node of event defining unconditional flow.

Construction of EFC tree structure is simplified by removing redundancy through the unconditional flow when event flow needs describing redundantly.

FIG. 17 illustrates control of DES by unconditional flow event. When IHBE is i6(1401), IHBE is updated not to $i_7$ (1403) but to $i_2$ (1701) to which $i_7$ (1403) is linked by the unconditional flow by the occurrence of unconditional flow control event $i_7$ (1403).

Even though interrupt event, return flow control event and unconditional flow control event are respectively mapped to corresponding actions just like other events, each of these actions may be executed or not when interrupt event, return flow control event or unconditional flow control event occurs, which differs from other events.

Figure 13:
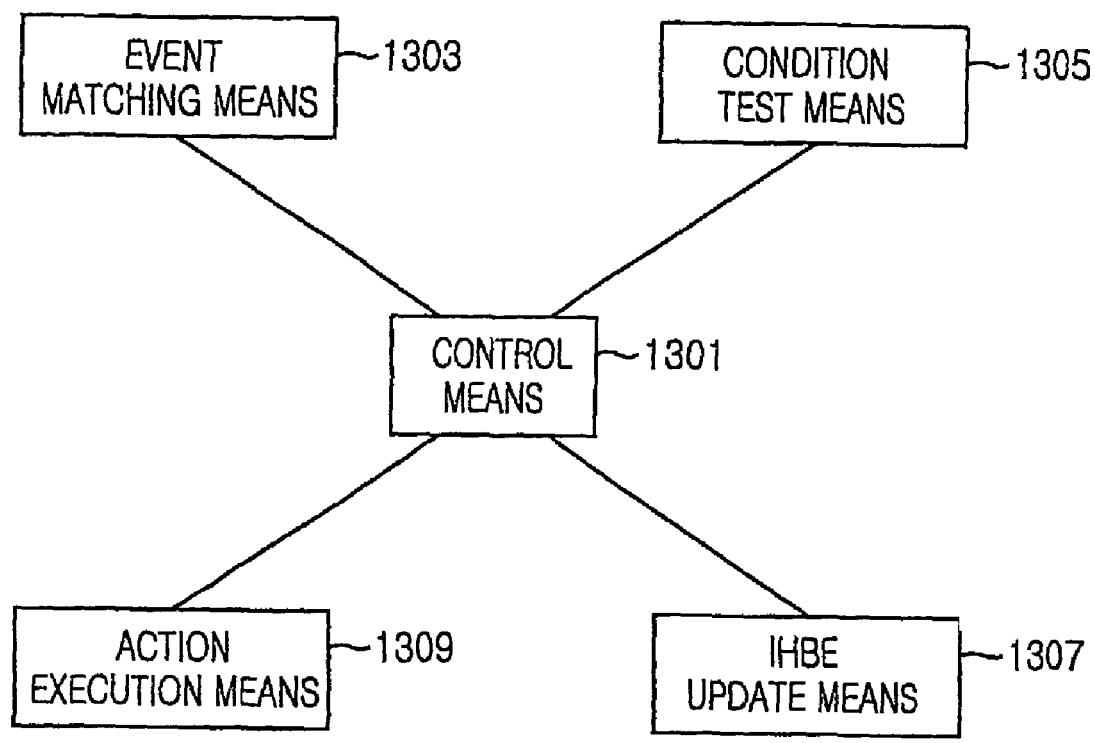
FIG. 13 is functional block diagram for describing Event Flow Control Engine according to an embodiment of the present invention.
Figure 14:
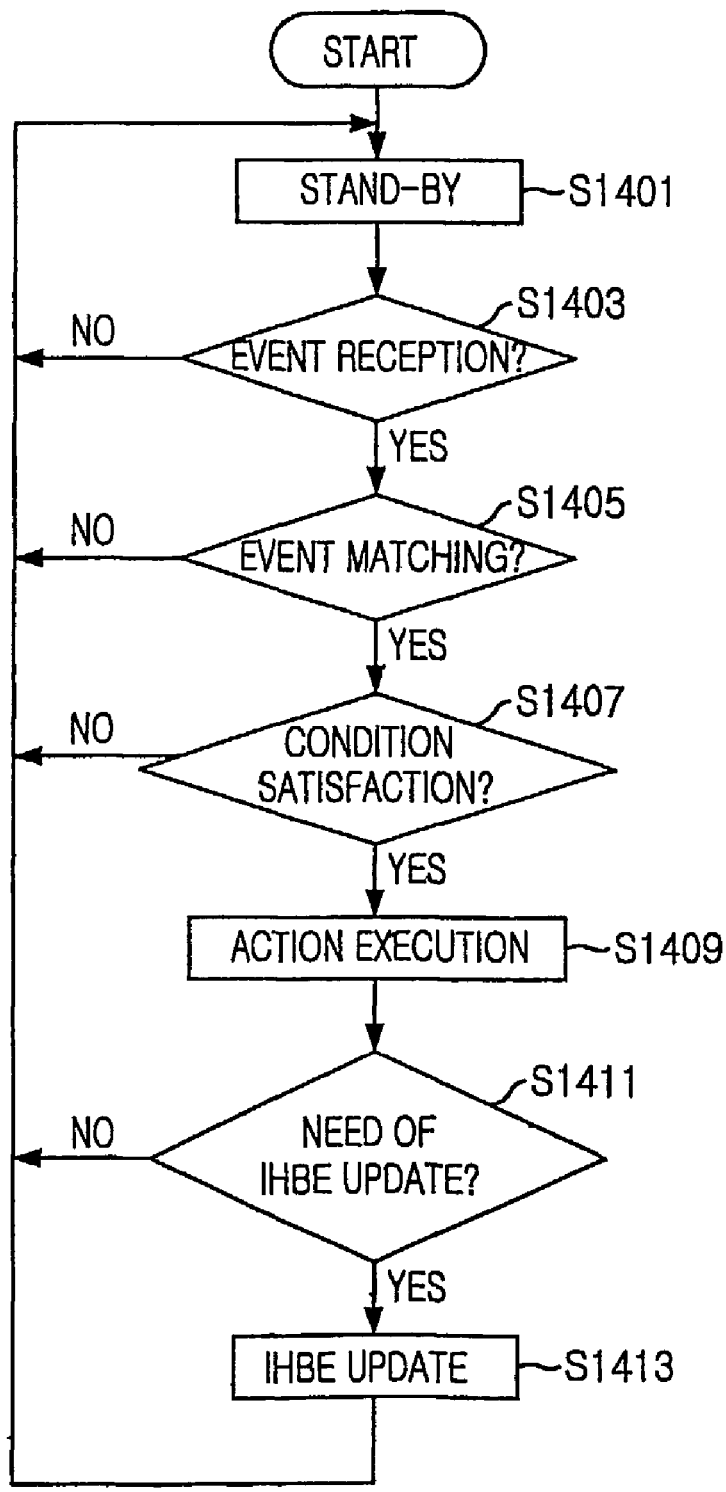
FIG. 14 is flowchart of controlling event flow on Event Flow Control Engine according to an embodiment of the present invention.

FIG. 13 is functional block diagram for describing Event Flow Control Engine according to an embodiment of the present invention; and FIG. 14 is flowchart of controlling event flow on Event Flow Control Engine according to an embodiment of the present invention.

As shown in FIG. 13, event flow control engine (EFCE) is excited whenever event occurs and controls EFC modelled DES with EFC including the extended characteristics.

EFCE comprises control means (1301), event matching means (1303), condition test means (1305), action execution means (1307) and IHBE update means (1309).

Control means (1301) is ready for input of event and excites event matching means (1303) and condition test means (1305) to determine event matching (S1405) and condition satisfaction (S1407). Action execution means (1307) and IHBE update means (1309) are excited, execute action corresponding to inputted event (S1409), and update IHBE (S1413) when inputted is matched to allowable events and conditions is met.

Event matching means (1303) determines event matching or whether or not inputted event is included in allowable events.

Condition test means (1305) determines if the condition for execution of inputted event is satisfied, update IHBE as inputted event in case of condition satisfaction, and excites action execution means (1307).

Action execution means (1307) executes action corresponding to inputted event satisfying condition to control EFC modelled DES.

IHBE update means (1309) determines whether or not the currently inputted event is return flow control event or unconditional flow control event, and re-updates current IHBE already updated by condition test means (1305) as event defined by return flow control event or unconditional flow control event on condition that inputted event should be return flow control event or unconditional flow control event.

IHBE is re-updated as the event node lately pushed in the global stack when inputted event is return flow control event, or as the event node designated by unconditional flow control event when inputted event is unconditional flow control event.

EFCE is initially in stand-by mode (S1401) as shown in FIG. 14 and starts controlling event flow of DES modelled with EFC when receiving event (S1403). EFCE performs event matching that is process of determining inputted event is allowable event (S1405). EFCE determines whether or not inputted event is one of allowable events to which current IHBE is allowed to transfer. The event-matching, step (S1405) is not performed on IHBE prohibited from self event flow and events included in the disabled event list.

When inputted event is matched, that is inputted event is one of allowable events to which current IHBE is allowed to transfer, EFCE determines if the condition for execution of inputted event is satisfied (S1407).

EFCE then updates IHBE as inputted event in case of condition satisfaction, and executes action corresponding to inputted event satisfying condition to control EFC modelled DES (S1409).

After action execution (S1409), EFCE determines if re-update of IHBE is of need (S1411). EFCE determines whether or not the currently inputted event is return flow control event or unconditional flow control event, and re-updates current IHBE already updated at the step of S1409 as event defined by return flow control event or unconditional flow control event on condition that inputted event should be return flow control event or unconditional flow control event (S1413). IHBE is re-updated as the event node lately pushed in the global stack when inputted event is return flow control event, or as the event node designated by unconditional flow control event when inputted event is unconditional flow control event.

Figure 18:
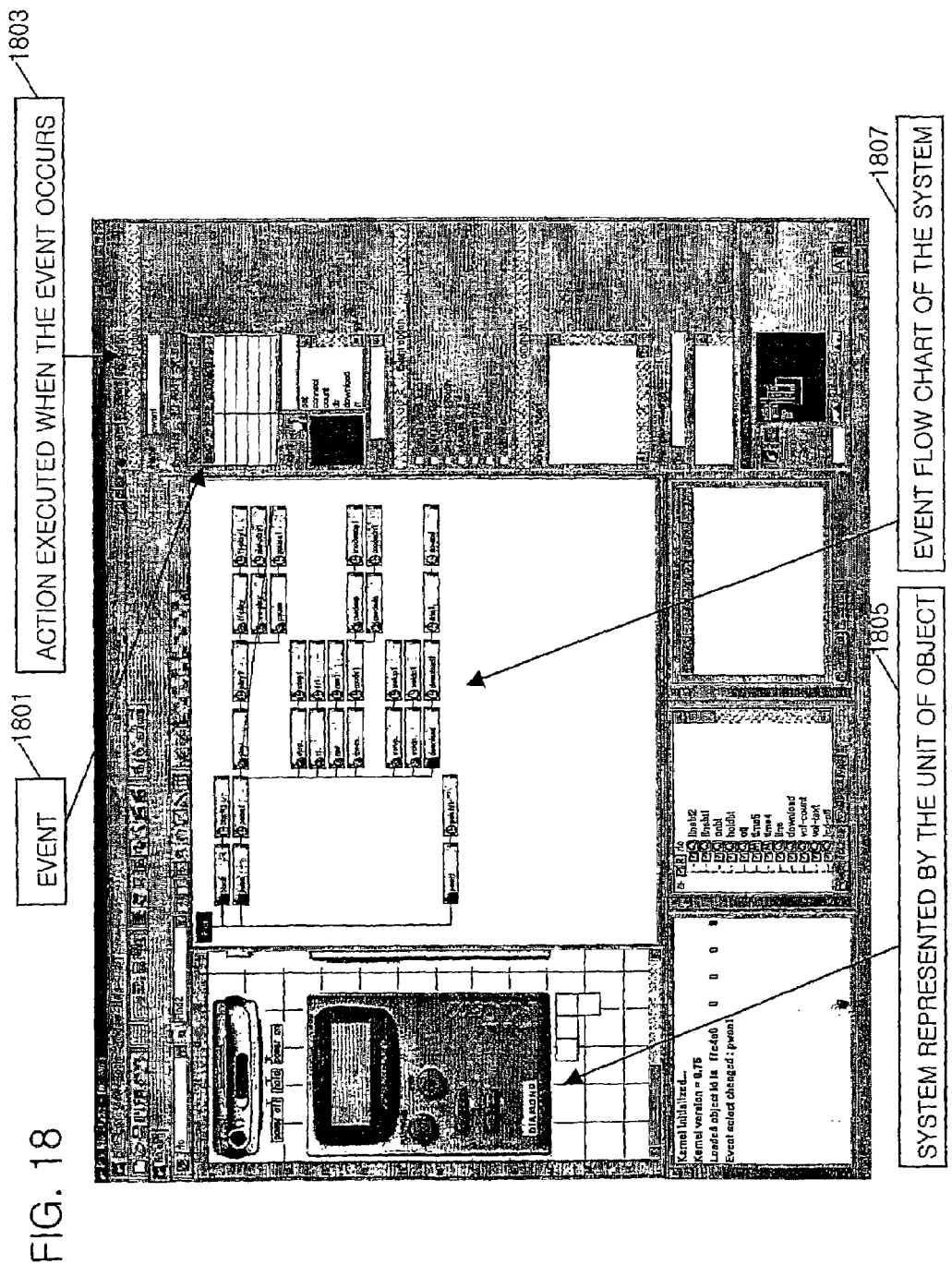
FIG. 18 illustrates interface of DES modelled as Event Flow Chart and including Event flow Control Engine.

FIG. 18 illustrates interface of DES modelled as Event Flow Chart and including Event flow Control Engine; and FIGS. 19A to 19I show pseudo program code implementing Event Flow Control Engine.

As shown in FIG. 18 illustrating MP3 player modelled with EFC in accordance with the present invention, left side (1805) of the interface displays outward appearance of the MP3 player composed in the object unit. Right side (1807) of the interface displays EFC tree structure representing the MP3 player according to the present invention. Individual events and actions corresponding to the individual events are displayed on upper side of the interface on-the-right (1801 and 1803). The DES modelled with EFC is directly controlled by EFCE in accordance with the present invention.

As described above, this method of the present invention can be embodied as a program and recorded in a computer-readable recording medium, such as a CD-ROM, RAM, ROM, floppy disk, hard disk, optical-magnetic disk, etc.

As described above, this method of the present invention can completely describe the Discrete Event System with intuition and ease only by describing event flow without using the abstract concept of state of the Discrete Event System. The present invention hides the process of understanding the abstract concept of state and describes concrete event. The present invention has the merit that any one who is not familiar with the concept of state can model DES and can implement and modify the modelling and that the modelling according to the present invention is not dependent on designers.

Another advantage of the present invention is that drawing or representation of modelled DES is easy. Hierarchical relationship of SC is represented by diagram and transition relationship between states by directed edge. EFC is simple tree structure simultaneously representing the hierarchical relationship and transition relationship, which simplifies constructing and modifying chart. The size of super-state diagram should be enlarged for representing new sub-state in the super-state. EFC according to the present invention con simply modify the change by adding new node to EFC tree structure.

While the present invention has been described with respect to certain preferred embodiments, it will be apparent to those skilled in the art that various changes and modifications may be made without departing from the scope of the invention as defined in the following claims.

What is claimed is:

1. A method for modelling a Discrete Event System including the steps of:
   a) receiving a user-defined requirement and specification of the Discrete Event System;
   b) extracting events and actions from the requirement and specification and storing the events and actions;
   c) generating a tree-type data structure including a start node;
   d) searching the stored events to determine existence of allowable events at an event represented by a leaf node, which quits the generation of the data structure when there is no allowable event;
   e) when there is an allowable event in the stored events, generating a child node of the leaf node, the child node representing the allowable event;
   f) iterating the step of searching and the step of generating a child node for all the leaf nodes of the data structure; and
   g) generating a flag according to whether or not the event represented by the leaf node is an interupt event.

2. The method of claim 1, wherein the method further includes the step of generating and saving a flag according to whether or not self event flow of the event represented by the leaf node is allowed.

3. The method of claim 1, wherein the interrupt event makes a current node representing an event to be pushed to and saved in a stack when the interrupt event occurs.

4. The method of claim 1, wherein the method further includes the step of generating a flag according to whether or not the event represented by the leaf node is a return flow control event.

5. The method ofclaim 4, wherein the return flow control event makes the node saved in the stack pop and a state of the Discrete Event System jump into the popped node when the return flow control event occurs.

6. The method of claim 1, wherein the method further includes the step of generating a flag according to whether or not the event represented by the leaf node is an unconditional flow control event.

7. The method of claim 6, wherein the unconditional event flow makes a state of the Discrete Event System jump into the predetermined node representing a predetermined event.

8. A computer-readable storage medium for recording a program for performing a method for modelling a Discrete Event System in a modelling system provided with a processor, the method including the steps of:
   a) receiving a user-defined requirement and specification of the Discrete Event System;
   b) extracting events and actions from the requirement and specification and storing the events and actions;
   c) generating a tree-type data structure including a start node;
   d) searching the stored events to determine existence of allowable events at an event represented by a leaf node, which quits the generation of the data structure when there is no allowable event;

e) when there is an allowable event in the stored events, generating a child node of the leaf node, the child node representing the allowable event;

f) iterating the step of searching and the step of generating a child node for all the leaf nodes of the data structure; and g) generating a flag according to whether or not the event represented by the leaf node is an interrupt event.

9. The computer-readable storage medium of claim 8, wherein the method further includes the step of generating and saving a flag according to whether or not self event flow of the event represented by the leaf node is allowed.

10. The computer-readable storage medium of claim 8, wherein the interrupt event makes a current node representing an event to be pushed to and saved in a stack when the interrupt event occurs.

11. The computer-readable recording medium of claim 8, wherein the method further includes the step of generating a flag according to whether or not the event represented by the leaf node is a return flow control event.

12. The computer-readable storage medium of claim 8, wherein the return flow control event makes the node saved in the stack pop and a state of the Discrete Event System jump into the popped node when the return flow control event occurs.

13. The computer-readable storage medium of claim 8, wherein the method further includes the step of generating a flag according to whether or not the event represented by the leaf node is an unconditional flow control event.

14. The computer-readable storage medium of claim 8, wherein the unconditional event flow makes a state of the Discrete Event System jump into the predetermined node representing a predetermined event.

* * * * *